United States Patent
do Amaral Assy et al.

(10) Patent No.: US 11,980,121 B2
(45) Date of Patent: May 14, 2024

(54) AGRICULTURAL PNEUMATIC METERS

(71) Applicant: Jose Roberto do Amaral Assy, Caldas Novas (BR)

(72) Inventors: Jose Roberto do Amaral Assy, Caldas Novas (BR); Fernando Jorge Sanches, Sao Paulo (BR)

(73) Assignee: DO AMARAL ASSY, JOSE ROBERTO, Caldas Novas-Go (BR)

( * ) Notice: Subject to any disclaimer, the term of this patent is extended or adjusted under 35 U.S.C. 154(b) by 666 days.

(21) Appl. No.: 17/134,004

(22) Filed: Dec. 24, 2020

(65) Prior Publication Data

US 2021/0195830 A1 Jul. 1, 2021

(30) Foreign Application Priority Data

Dec. 27, 2019 (BR) .......................... 1020190280174

(51) Int. Cl.
*A01C 7/04* (2006.01)
(52) U.S. Cl.
CPC .................................. *A01C 7/046* (2013.01)
(58) Field of Classification Search
CPC .................................................... A01C 7/046
See application file for complete search history.

(56) References Cited

U.S. PATENT DOCUMENTS

| | | | |
|---|---|---|---|
| 4,450,979 A | 5/1984 | Deckler | |
| 5,058,766 A | 10/1991 | Deckler | |
| 5,170,909 A | 12/1992 | Lundie et al. | |
| 6,109,193 A * | 8/2000 | Crabb | A01C 7/102 111/900 |
| 7,798,080 B2 * | 9/2010 | Sauder | A01C 7/04 222/527 |
| 11,547,037 B2 * | 1/2023 | Crooymans | A01C 7/046 |
| 2010/0224110 A1 * | 9/2010 | Mariman | A01C 7/046 111/11 |
| 2012/0067261 A1 * | 3/2012 | Garner | A01C 7/20 111/171 |
| 2015/0305229 A1 * | 10/2015 | Sauder | A01C 7/12 111/185 |
| 2017/0303463 A1 * | 10/2017 | do Amaral Assy | A01C 7/046 |
| 2017/0311536 A1 * | 11/2017 | Sauder | A01C 7/128 |
| 2018/0092291 A1 * | 4/2018 | Duman | A01C 21/005 |
| 2019/0230846 A1 * | 8/2019 | Koch | A01C 7/201 |
| 2019/0364718 A1 * | 12/2019 | Garner | A01C 7/105 |
| 2020/0229343 A1 * | 7/2020 | do Amaral Assy | A01C 19/02 |
| 2020/0337220 A1 * | 10/2020 | Crooymans | A01C 7/102 |
| 2020/0359558 A1 * | 11/2020 | Donadon | A01C 7/128 |
| 2021/0112703 A1 * | 4/2021 | Johnson | A01C 21/005 |
| 2021/0251129 A1 * | 8/2021 | Hahn | A01C 7/046 |

\* cited by examiner

*Primary Examiner* — Jamie L McGowan
(74) *Attorney, Agent, or Firm* — Greenberg Traurig, LLP (57) ABSTRACT

Pneumatic meters for the singularization and metering of seeds. Such pneumatic meters may include a rotating disk with a plurality of holes arranged radially. The plurality of holes may define a circular seed path passage when the rotating disk rotates. The pneumatic meters may include a seed container structure associated with the rotating disk.

19 Claims, 7 Drawing Sheets

AGRICULTURAL PNEUMATIC METERS

CROSS REFERENCE TO RELATED APPLICATION

This application claims priority under 35 U.S.C. § 119 to Brazilian patent application No. BR 102019028017-4, filed 27 Dec. 2019, the entire disclosure of which is incorporated herein by this reference.

TECHNICAL FIELD

The present disclosure generally relates to precision agriculture. In some examples, the disclosure is related to the singularization and metering of seeds in pneumatic meters.

BACKGROUND

Precision agriculture is the union of agrotechnology with geostatistical analyses of crops. With the use of precision agriculture, it is possible to optimize planting in a specific way for each agricultural genus, reducing operating costs and increasing the quality and yield of the harvest.

To achieve greater profits, farmers have increasingly invested in equipment and technological applications in agricultural implements that provide greater productivity in their plantations. In this context, planters today often employ the use of seed dispensers, which may also be referred to as "seed meters" or "seed feeders."

Seed meters can be classified as mechanical or pneumatic. Mechanical seed meters operate by activating a rotating disk, which transports the seeds in their holes to a region for releasing the seeds from the disk. In the release region, a mechanical element removes the seed from the holes and allows them to be directed to the planting furrow by passing through a meter outlet opening.

In pneumatic seed meters the seeds are captured by the holes in the rotating disk by inducing a pressure gradient (e.g., a vacuum) between the two faces of the disk. After coupling the seeds in the holes of the disk, there is a step of "seed release," characterized by the vacuum being cut in a specific portion of the meter. This portion of the meter has a seed outlet opening, which exposes the system to atmospheric pressure and, as a consequence, cuts the vacuum condition. The vacuum cut causes the suction forces in the disk holes to be stopped and the seeds are decoupled from the disk holes. The seed are then led to a seed outlet opening of the meter, in which a conducting duct is coupled to direct the seeds to the planting furrows.

There are pneumatic positive-pressure and negative-pressure seed meters on the market. However, due to the greater simplicity of their construction, pneumatic negative-pressure seed meters are more widely used than pneumatic positive-pressure seed meters. An example of a pneumatic seed meter is described in U.S. Pat. No. 5,170,909, by Lundie et al.

Pneumatic negative-pressure seed meters usually operate in conjunction with a turbine. This turbine is connected to each of the planting lines by a hose network and is driven by a transmission system or by a hydraulic system of the agricultural implement (e.g., planter) on which the lines are mounted. The main configuration being used in large plantations for these agricultural implements involves a planter pulled by a tractor.

During operation, the turbine absorbs the air present in the pipelines and inside the interconnected meters and directs it out of the system, causing an air flow from the inside of the system to outside the system.

The air flow provided by the action of the turbine promotes a pressure difference between the faces of the meter disk. This pressure difference gives rise to suction forces in the holes of the rotating disk vertically positioned inside the meter (e.g., perpendicular to the direction of the air flow). These suction forces allow the coupling of the seeds on the face of the disk that is positioned next to the internal seed reservoir of the meter.

One of the great advantages of pneumatic seed meters over mechanical seed meters relates to greater planting speed. Pneumatic seed meters are capable of operating at higher seed disk speeds. The higher disk speeds allow for higher agricultural implement speeds and, as a consequence, may increase the speed of planting. In large plantations, the higher agricultural implement speeds may increase the final yield of the harvest.

The possibility of operating at higher speeds for the rotating disk is a great differential for pneumatic seed meters. However, when rotating the disks at higher speeds, the equipment's seed singularization (e.g., depositing one and only one seed from each hole in the rotating disk) is often impaired.

When the disk is being rotated at high speeds there is a greater tendency for the seeds to escape from the holes of the disk prematurely, such as before the vacuum cut. This may lead to failures. When escaping from the holes in the disk, the seeds can couple to the adjacent holes, causing doubles. These errors distort the planting arrangement, reducing the yield of the harvest.

Additionally, in sowing conditions where the seed disks operate at high rotational speeds, there is an imminent risk that the seeds will be thrown by the disk, and may pass through the meter outlet opening in order to deposit more seeds than desired in the soil.

The inadequate deposition of seeds in the soil creates problems, including loss of efficiency in the plantation, because there will be more plants than necessary. Additionally, the seeds thrown by the planting disk will potentially be deposited very close to the other seeds, causing the occurrence of double or multiple seeds in the soil. The occurrence of double or multiple seeds in the soil is known to be bad for planting, given that in this condition the resulting plants compete with each other and produce less efficiently.

The ideal condition for the deposition of seeds in the grooves is given by the uncoupling of the seed from the disk followed by its exit from the meter by gravitational action, in a unique way.

There are some potential solutions in the state of the art to alleviate the problems of seed release described previously. U.S. Pat. No. 4,450,979 by Deckler describes a brush-type seed retention structure for mechanical seed meters. This brush has the function of retaining the seeds in the cells of the seed disk for a portion of the seed path. U.S. Pat. No. 5,058,766, also by Deckler, describes a brush-type seed retention structure for a pneumatic seed meter.

Although functional, brush-type retaining structures tend to have a short service life due to the constant friction of the bristles with the seeds and a surface of the meter seed disk, which results in wear of these bristles. This gradually compromises the efficiency of these structures in the task of retaining the seeds in the cells of the seed disk, leading to decreased harvest yield.

SUMMARY

In order to circumvent the drawbacks found in conventional pneumatic meters, the present disclosure introduces a series of improvements. For example, pneumatic meters may include a rotating disk with a plurality of holes that may define a seed passage path when the disk rotates. The pneumatic meter may also include a seed container structure associated with the rotating disk to prevent the seeds from being improperly thrown to the soil.

According to additional or alternative realizations of the disclosure, the following characteristics, alone or in technically possible combinations, may also be present: (1) the seed container structure is positioned parallel to the disk, overlapping a seed passage path; (2) the seed container structure includes a mounting bracket coupled to an upper ring positioned on a first side of the rotating disk and a lower ring positioned on a second, opposite side of the rotating disk; (3) the mounting bracket of the seed container structure is configured to be fully supported in the pneumatic meter by the rotating disk; (4) the mounting bracket of the seed container structure is configured to be coupled with the rotating disk by the upper ring and the lower ring; (5) the seed container structure includes a recess that is positioned along the circular seed passage path of the rotating disk, wherein the recess is shaped and sized to allow a single seed within each hole of the plurality of holes to pass through the recess; (6) the recess of the seed container structure has a geometry (e.g., diameter, shape, etc.) based on the average size of the seeds within the plurality of holes; (7) the seed container structure overlaps a seed release region of the pneumatic meter and is positioned adjacent to a front face of the rotating disk; (8) the rotating disk has a rear face and a front face, the front face being positioned for receiving the seeds and transporting the seeds to a seed outlet; (9) the front face of the rotating disk has a smooth finish (e.g., a polished surface finish); (10) the front face of the rotating disk is provided with at least one geometric element (e.g., low- and/or high-relief geometric elements), wherein the at least one geometric element includes at least one of a groove or a protrusion in the front face; (11) the at least one geometric element is configured to contact a support region of the seed container structure; (12) the support region of the seed container structure is located between an external radius and an internal radius of the rotating disk, which may be tangent to the support region of the seed container structure; (13) the seed container structure has a seed entry face, in which the seeds are received from the seed passage path, and a seed output face, between the two faces the seed container structure recess; (14) the seed container structure includes a seed deflector arranged along the seed entry face; (15) the seed container structure is made of one or more materials including: polymers, ceramics, and/or metals; and/or (16) the seed container structure includes a brush with flexible bristles, the flexible bristles of the brush overlapping the seed passage path.

BRIEF DESCRIPTION OF THE DRAWINGS

Objectives, advantages, and technical and functional improvements of the disclosure will be better understood from the reading of the descriptions of their particular embodiments, made below in relation to the attached figures, which illustrate ways of particular embodiments, and not limiting, in which.

DETAILED DESCRIPTION

The disclosure will now be described with respect to example embodiments, referring to the attached figures. In the following figures and description, similar parts are marked with equal reference numbers. The figures are not necessarily in scale, and certain features may be shown with exaggeration of scale or in some schematic way. Additionally, details of conventional elements may not be shown in order to illustrate this description more clearly and concisely.

The present disclosure is susceptible to multiple different embodiments and is capable of implementation in multiple different ways. Specific embodiments are described in detail and shown in the figures, with the understanding that the description is to be considered as an exemplification of the principles disclosed herein and is not intended to limit the disclosure only to what is illustrated and described. It should be recognized that the different teachings of the embodiments discussed below may be employed separately or in any suitable combination to produce the same technical effects.

The present disclosure includes an improvement on pneumatic meters. For example, the disclosure concerns a seed container structure for the improvement of the seed release stage in plantations that use pneumatic meters. Such seed container structures are intended to eliminate, or at least alleviate, problems that may arise during the seed release stage in known pneumatic seed meters.

Figure 1:
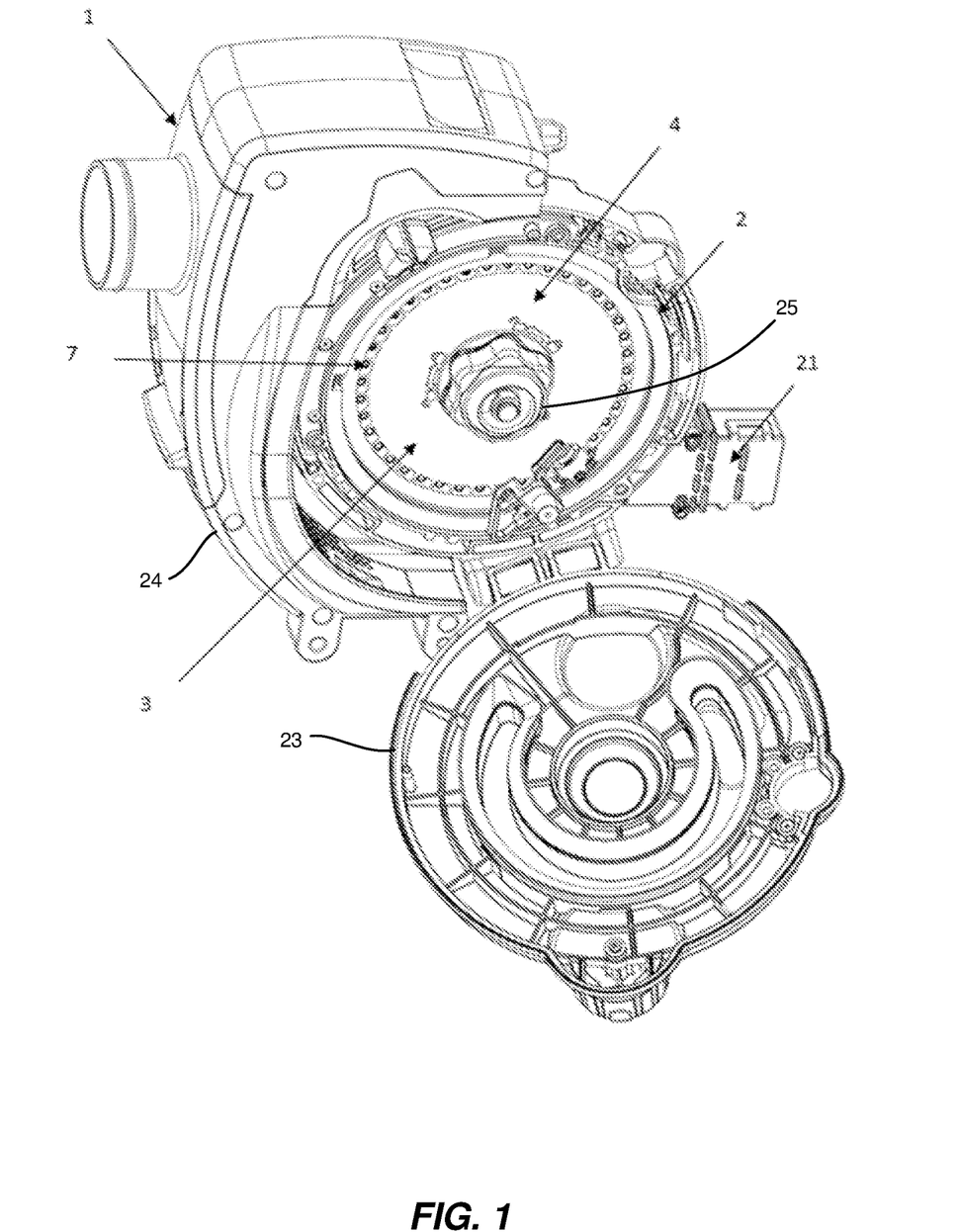
FIG. 1 is a perspective view of the pneumatic meter with emphasis on its internal structures.
Figure 2:
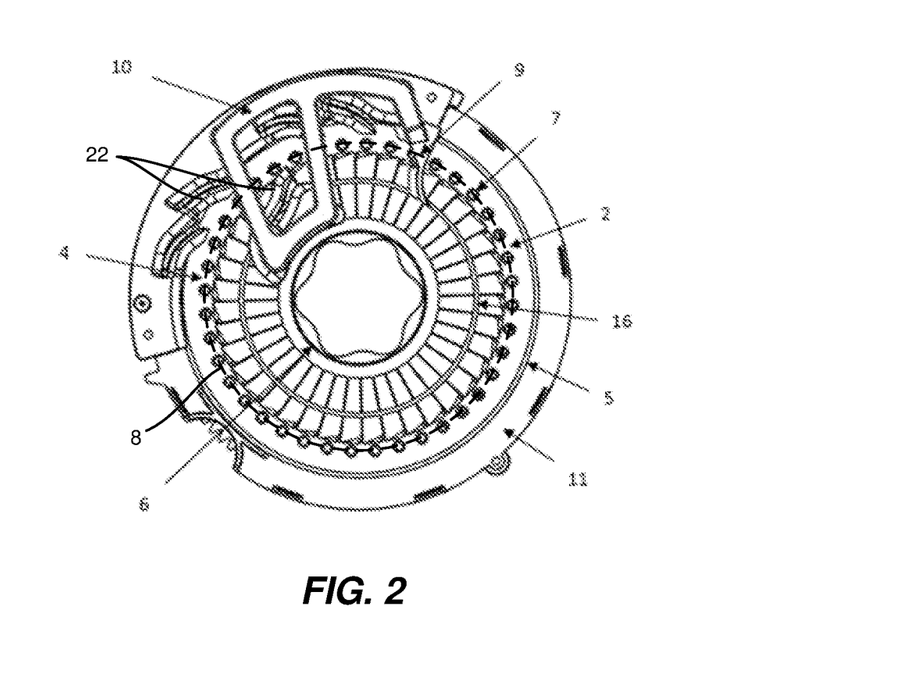
FIG. 2 is a top view of the rotating disk assembly plus support and seed container structure.

As shown in FIG. 1, the present disclosure includes a pneumatic seed meter 1 with a rotating disk 2, which may be provided with a plurality of holes 7 arranged radially defining a circumference, conveniently called a seed passage path 8 (illustrated in FIG. 2 by dashed lines).

In some embodiments, the rotating disk 2 may be coupled to the pneumatic meter 1 on the cover 23 or the base 24 of the seed meter 1 using a shaft 25 on which the rotating disk 2 is attached by its center, as illustrated in FIG. 1.

In some embodiments, the rotating disk 2 is attached to the shaft 25, forming a unique structure in which the shaft 25 is responsible for transmitting torque to the disk. This configuration employs a central drive mechanism for rotating the rotating disk 2.

In additional embodiments, the rotating disk 2 may rotate with respect to a central axis on which the rotating disk 2 is mounted, but the drive may be performed by engagement with a peripheral region of the rotating disk 2.

Figure 3:
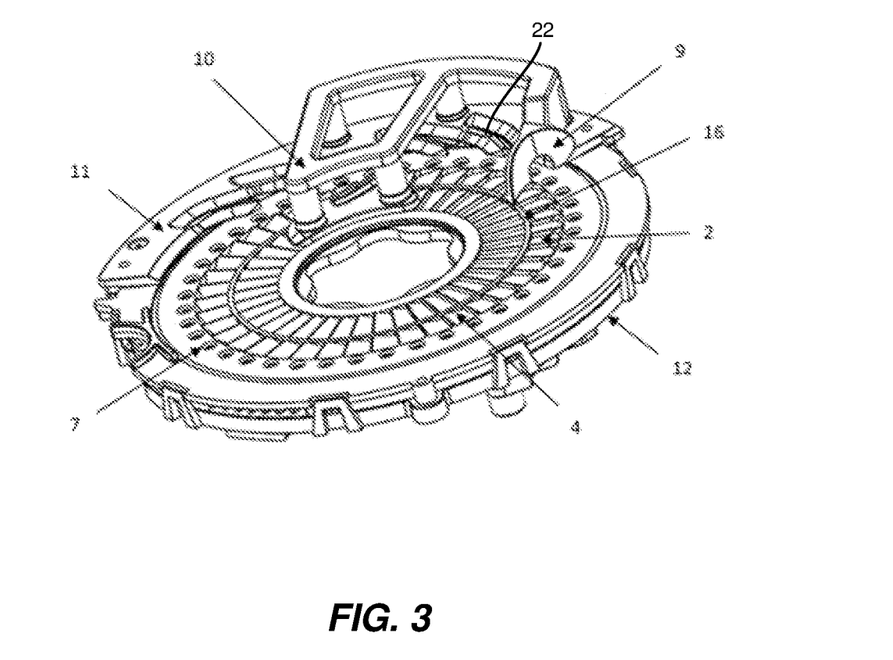
FIG. 3 is a perspective view of the rotating disk set plus support and seed container structure.
Figure 4:
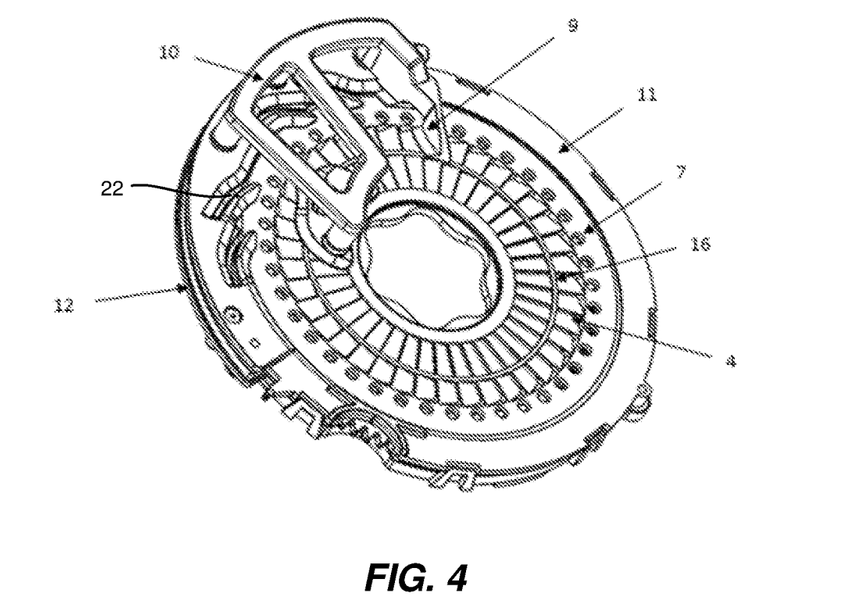
FIG. 4 is a perspective view of the rotating disk set plus support and seed container structure.
Figure 5:
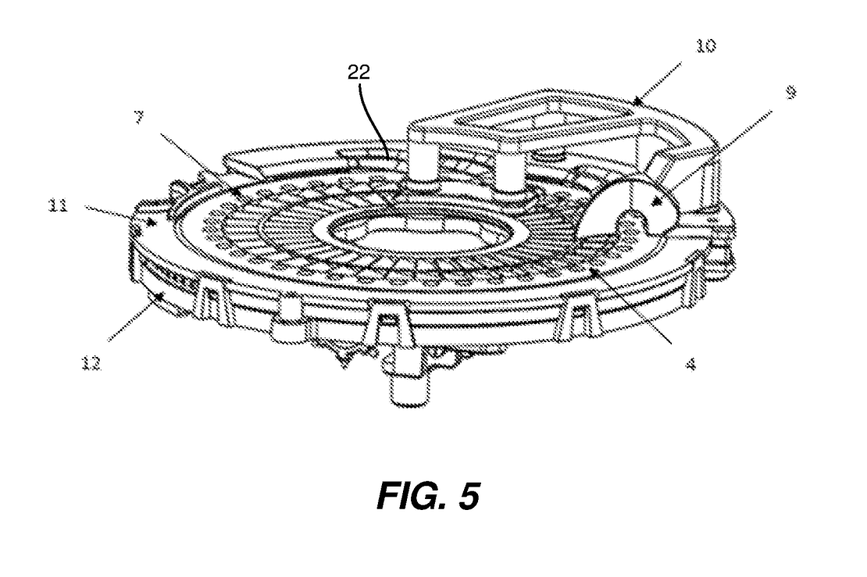
FIG. 5 is a front view of the rotating disk assembly plus support and seed container structure.
Figure 6:
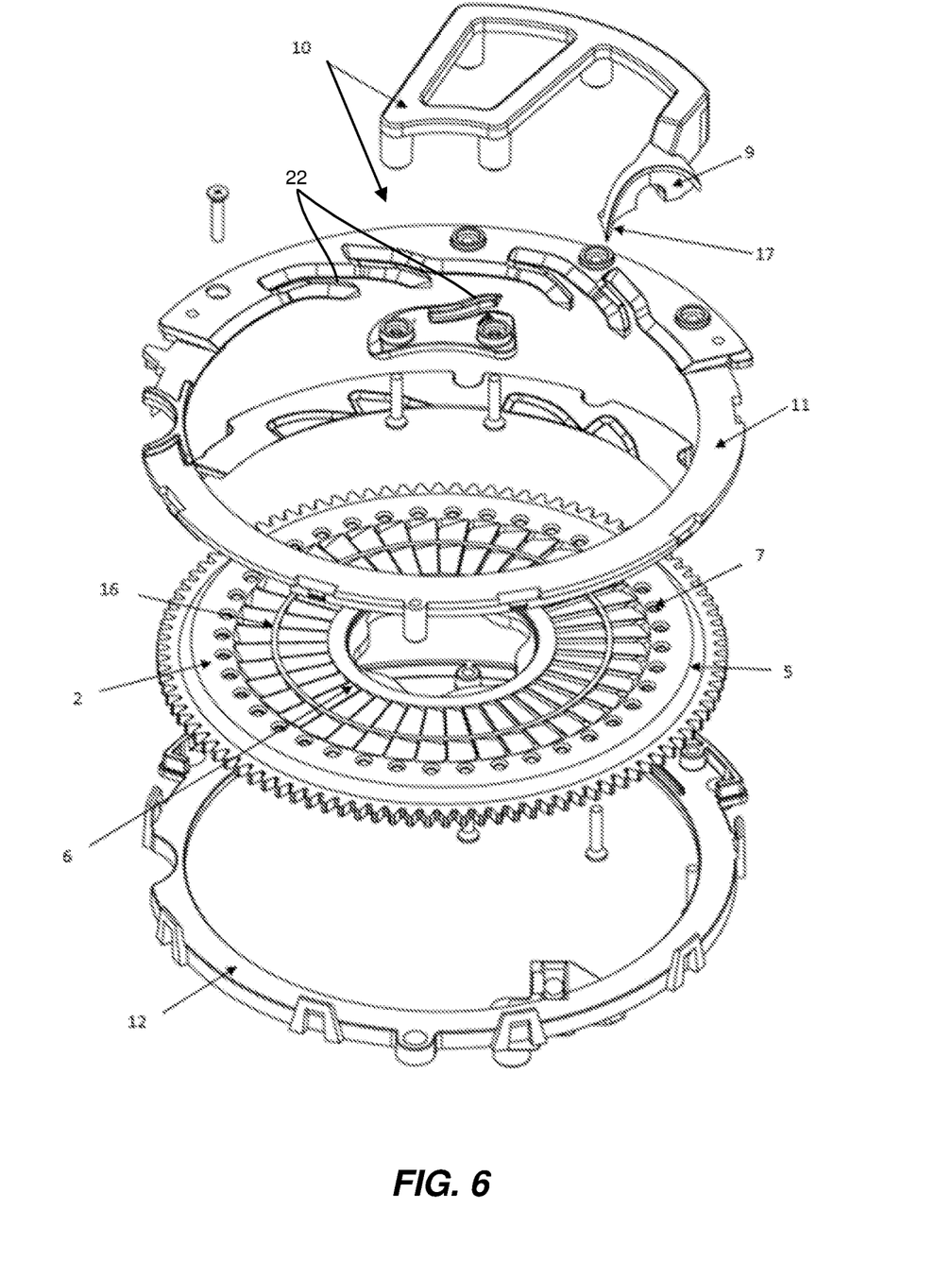
FIG. 6 is a top view of the rotating disk assembly plus support and seed container structure.

Referring to FIGS. 2, 3, and 4, in order to alleviate the problems arising from the seed release step known in conventional pneumatic meters, the pneumatic meter 1 of the present disclosure may include a seed container structure 9. This seed container structure 9 may be positioned over (e.g., abutting against) the front face 4 of the rotating disk 2, so as to overlap the seed passage path 8.

Singulators 22 may be positioned over a front face of the rotating disk 2 such that end portions of the singulators 22 touch the rotating disk 2 along the seed passage path 8. The positioning of the singulators 22 on the rotating disk 2 is shown in FIGS. 2-5. In some embodiments of the present disclosure, the seed container structure 9 acts in conjunction with the singulators 22 to ensure that excess seeds that may be coupled to the holes 7 of the rotating disk 2 may be pushed and fall into an internal reservoir of the seed meter 1.

When the rotating disk 2 operates at high angular speeds, in addition to the problems of improper pitching of seeds previously described, it is possible for seed releases to occur due to the interaction of the singulators 22 with seeds at the high angular speeds of the rotating disk 2. The seeds that collide with the singulators 22 can be launched towards a seed outlet opening 21 (FIG. 1) of the seed meter 1 instead of being scraped from the disk and returned to the internal seed reservoir. For this reason, the seed container structure 9 may be positioned before the seed outlet opening 21 of the seed meter 1 to act as a barrier so that these seeds do not leave the seed meter 1, since the seed container structure 9 allows the exit of only those seeds that follow the seed passage path 3.

In some embodiments, the seed container structure 9 may be attached to a mounting bracket 10 that may be positioned to at least partially surround (e.g., fully surround) the rotating disk 2. One or more of the singulators 22 may also be coupled to this mounting bracket 10. The singulators 22 may help ensure that there is one seed in each hole.

In additional embodiments, the mounting bracket 10 may include an upper ring 11 and a lower ring 12 coupled to each other. The upper ring 11 and the lower ring 12 may be assembled to each other and to the rotating disk 2 to contain a portion (e.g., a peripheral portion) of the rotating disk 2 between them, as illustrated in FIGS. 3-6. It is possible to see an example coupling mechanism for coupling the upper ring 11 and the lower ring 12 in the exploded view of the system, illustrated in FIG. 6.

In this example, the mounting bracket 10 of the seed container structure 9 may cause the rotating disk 2 and the seed container structure 9 to move as a single unit. In other words, the mounting bracket 10 may be supported in the pneumatic seed meter 1 by the rotating disk 2, such that when the disk is removed or inserted in the pneumatic seed meter 1, the seed container structure 9 accompanies the rotating disk 2 as a single assembly, although the rotating disk 2 is rotatable relative to the seed container structure 9. In some embodiments, the mounting bracket 10 may be fully supported by the rotating disk 2, and may not be supported by any direct engagement with the base 24 of the pneumatic seed meter 1.

As shown in FIGS. 8-11, the seed container structure 9 may include a protrusion provided with a seed entry face 14 and a seed exit face 15. A central recess 13 (e.g., a cavity, a notch, etc.) may extend between the seed entry face 14 and the seed exit face 15 of the seed container structure 9.

Figure 7:
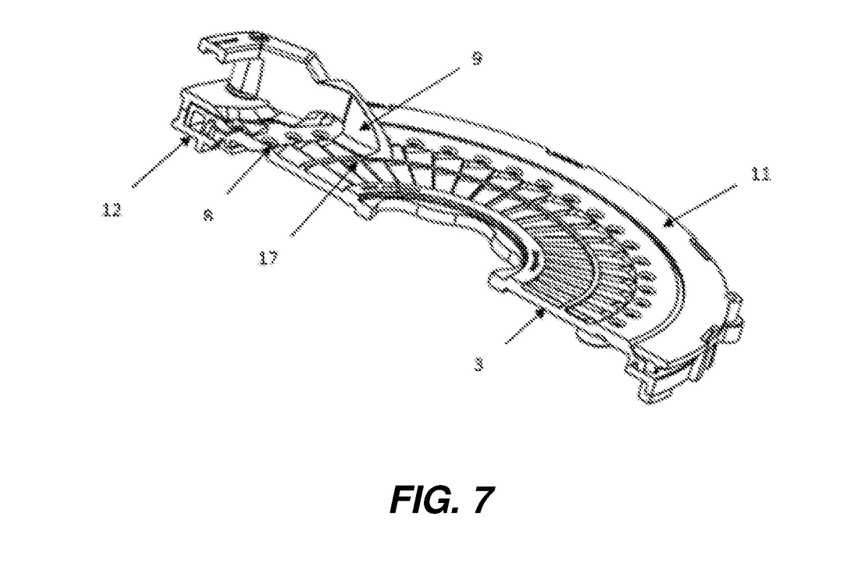
FIG. 7 is a cross-sectional view of the rotating disk assembly plus support and seed container structure.
Figure 8:
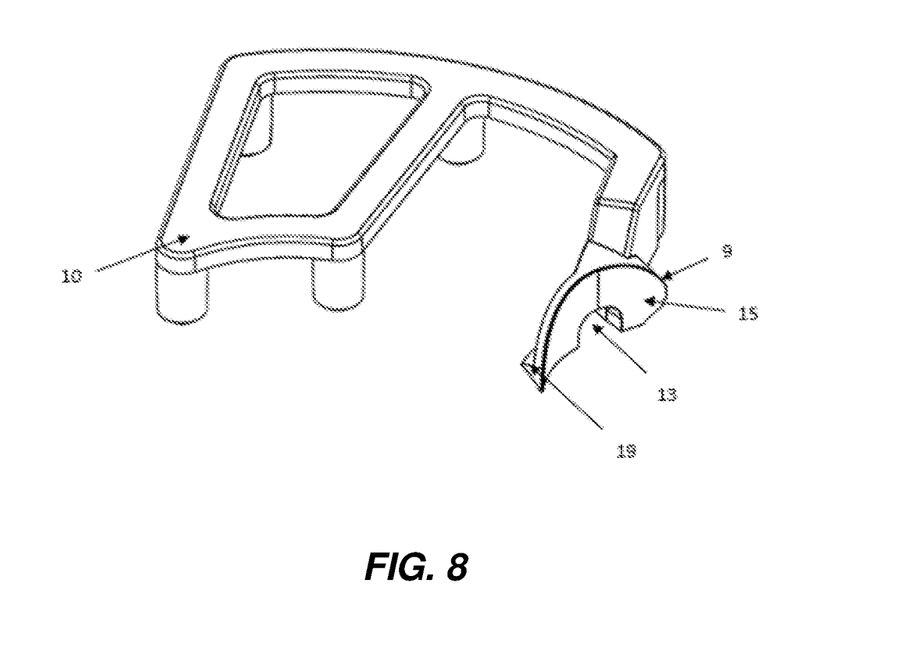
FIG. 8 is a front view of the support and seed container structure.
Figure 9:
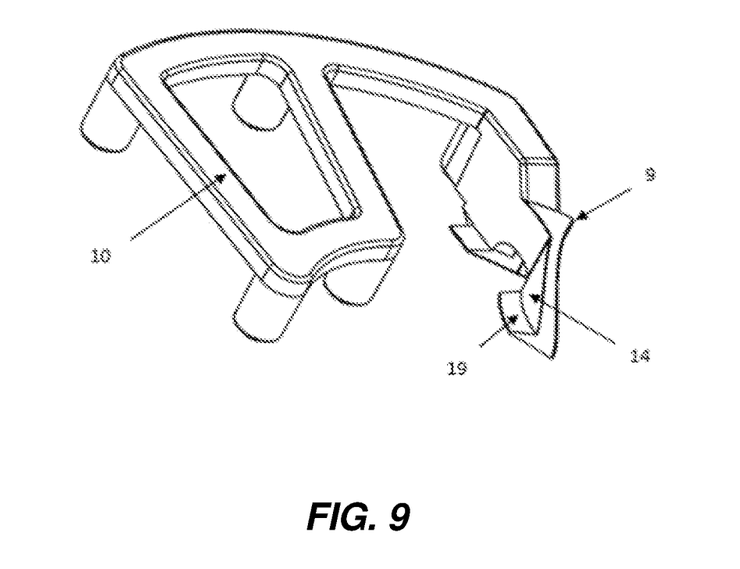
FIG. 9 is a lateral perspective view of the support and seed container structure.
Figure 10:
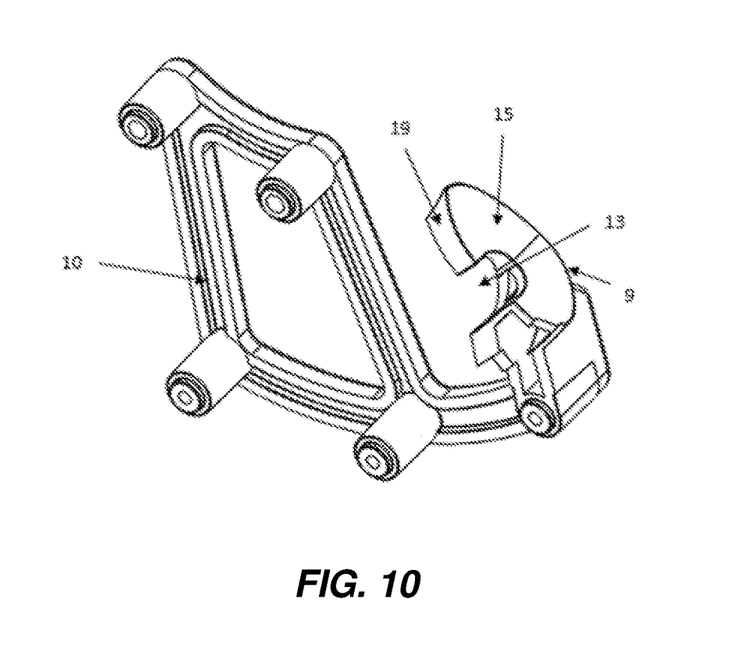
FIG. 10 is a rear perspective view of the support and seed container structure.
Figure 11:
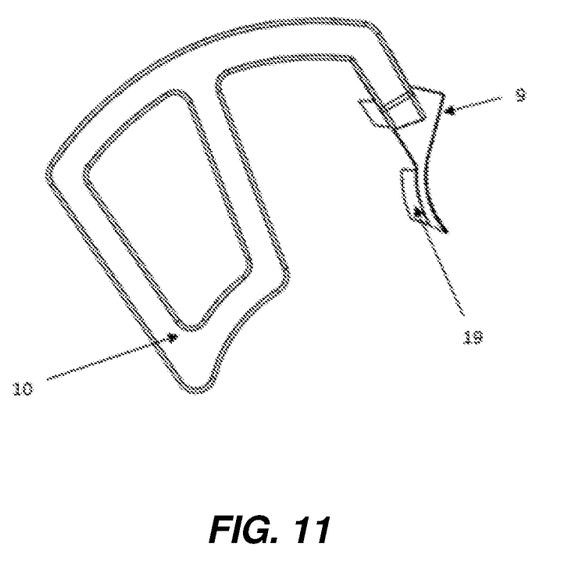
FIG. 11 is a top view of the support and seed container structure.

The central recess 13 of the seed container structure 9 may be positioned on the rotating disk 2 coincidentally with the seed passage path 8 (see FIGS. 2 and 7). This configuration allows the seeds appropriately captured in the holes of the rotating disk 7 to pass through the central recess 13 to the seed outlet opening 21 (FIG. 1).

In additional embodiments, the geometry of the central recess 13 may depend on the average geometry of the seeds of the species to be deposited. For example, the central recess 13 of the seed container structure 9 may have a curved (e.g., tubular) geometry. The curved geometry may mitigate the chance that some seed with irregular geometry becomes trapped in the central recess 13 of the seed container structure 9, since there are no parts that can serve as anchor points for such seeds, such as sharp corners and recesses. In addition, the geometry of the central recess 13 may be defined by the average size of the seeds to be processed by the seed meter 1, such that the central recess 13 may improve the efficiency of the seed container structure 9.

In some embodiments, the seed container structure 9 may contain support elements 17 (FIG. 7) in low- and/or high-relief, which may be designed to interact with complementary geometric elements 16 on the rotating disk 2 and assist in the positioning of the seed container structure 9 with respect to the rotating disk 2.

One of the possible configurations of a geometric element 16 (FIGS. 2-4 and 6) for the rotating disk 2 of the pneumatic meter 1 of the present disclosure is a protrusion (e.g., shoulder) designed to receive the seed container structure 9 in a support region 17 (FIG. 7) of the seed container structure 9 when positioned over the rotating disk 2.

In particular, these geometric elements 16 may have the shoulder in a high-relief circumference arranged between the outer radius 5 and the inner radius 6 of the disk. This geometric element 16 may be in the form of a circumference acting as a support for the seed container structure 9. In this example, at least a portion of the support element 17 of the seed container structure 9 may remain in constant contact with the geometric element 16 while the rotating disk 2 rotates. The contact of the support element 17 of the seed container structure 9 with the geometric element 16 can be seen in FIG. 7.

In another embodiment of the disclosure, the geometric element 16 may include a groove in low relief on the front face 4 of the rotating disk 2. In this configuration, the support element 17 of the seed container structure 9 may include a complementary protrusion (e.g., shoulder) in its structure to anchor in the grooved geometric element 16 of the rotating disk 2. This embodiment allows the geometric element 16 to act as a guide system for the movement of the seed container structure 9 on the front face 4 of the rotating disk 2.

In additional embodiments, the disclosure includes a seed deflector 19 on the seed entry face 14 of the seed container structure 9 in order to direct the seeds thrown by the rotating disk 2 inside the seed meter 1 to the seed reservoir 20. The seed deflector 19 may be in the form of an angled ramp surface of the seed container structure 9 in a position to be adjacent to the front face 4 of the rotating disk 2.

In some embodiments of the disclosure, the seed deflector 19 may include ramps positioned on the edge of the seed entry face 14 of the seed container structure 9 in a location to be adjacent to the front face 4 of the rotating disk 2.

Although the disclosure has been specifically described in relation to particular embodiments, it should be understood that variations and modifications will be evident to technicians in the subject matter and can be done without departing from the scope of protection of the present disclosure. Consequently, the scope of protection is not limited to the embodiments described, but is limited only by the attached claims, the scope of which must include all equivalents.

What is claimed is:

1. A pneumatic meter, comprising:
 a rotating disk with a plurality of holes arranged radially, the plurality of holes defining a circular seed passage path when the rotating disk rotates;
 a seed singulator positioned along the seed passage path for singulating seeds in the plurality of holes; and
 a seed container structure positioned over the rotating disk along the circular seed passage path after the seed singulator, the seed container structure being shaped and positioned to block seeds that are not within the seed passage path and to allow seeds to pass that are within the seed passage path.

2. The pneumatic meter of claim 1, wherein the seed container structure comprises a mounting bracket coupled to an upper ring positioned on a first side of the rotating disk and a lower ring positioned on a second, opposite side of the rotating disk.

3. The pneumatic meter of claim 2, wherein the mounting bracket of the seed container structure is configured to be coupled with the rotating disk by the upper ring and the lower ring.

4. The pneumatic meter of claim 1, wherein the mounting bracket of the seed container structure is configured to be fully supported in the pneumatic meter by the rotating disk.

5. The pneumatic meter of claim 1, wherein the seed container structure comprises a recess that is positioned along the circular seed passage path of the rotating disk, wherein the recess is shaped and sized to allow a single seed within each hole of the plurality of holes to pass through the recess.

6. The pneumatic meter of claim 5, wherein the recess of the seed container structure has a geometry based on the average size of seeds within the plurality of holes.

7. The pneumatic meter of claim 1, wherein the seed container structure has a seed entry face through which seeds are received along the seed passage path, and a seed output face, wherein the recess of the seed container structure is located between the seed entry face and the seed output face.

8. The pneumatic meter of claim 7, wherein the seed container structure comprises a seed deflector extending from the seed entry face.

9. The pneumatic meter of claim 1, wherein the seed container structure overlaps a seed release region of the pneumatic meter and is positioned adjacent to a front face of the rotating disk.

10. The pneumatic meter of claim 1, wherein the rotating disk has a rear face and a front face, wherein the front face is configured for receiving and transporting the seeds to a seed outlet.

11. The pneumatic meter of claim 10, wherein the front face of the rotating disk has a smooth finish.

12. The pneumatic meter of claim 10, wherein the front face of the rotating disk has a surface with at least one geometric element, wherein the at least one geometric element comprises at least one of a groove or a protrusion in the front face.

13. The pneumatic meter of claim 12, wherein the at least one geometric element is configured to contact a support region of the seed container structure.

14. The pneumatic meter of claim 13, wherein the support region of the seed container structure is located between an external radius and an internal radius of the rotating disk.

15. The pneumatic meter of claim 1, wherein the seed container structure is made of one or more of the following materials:
 a polymer material;
 a ceramic material; or
 a metal material.

16. The pneumatic meter of claim 1, wherein the seed container structure is positioned along a face of the rotating disk on opposing sides of the seed passage path.

17. The pneumatic meter of claim 1, wherein the seed container structure arches from one side of the seed passage path, over the seed passage path, and to an opposing side of the seed passage path.

18. The pneumatic meter of claim 5, wherein the recess has a curved geometry arching over the seed passage path.

19. The pneumatic meter of claim 7, wherein at least a portion of the seed entry face extends away from and substantially perpendicular to a face of the rotating disk.

* * * * *